US011866975B2

(12) United States Patent
Schuler et al.

(10) Patent No.: US 11,866,975 B2
(45) Date of Patent: Jan. 9, 2024

(54) FURNITURE DRIVE

(71) Applicant: Julius Blum GmbH, Hoechst (AT)

(72) Inventors: Thomas Schuler, Hard (AT); André Hammerer, Alberschwende (AT); Thomas Folie, Dornbirn (AT); Irmela Mara Geller, Dornbirn (DE)

(73) Assignee: Julius Blum GmbH, Hoechst (AT)

( * ) Notice: Subject to any disclaimer, the term of this patent is extended or adjusted under 35 U.S.C. 154(b) by 120 days.

(21) Appl. No.: 17/545,443

(22) Filed: Dec. 8, 2021

(65) Prior Publication Data

US 2022/0098907 A1 Mar. 31, 2022

Related U.S. Application Data

(63) Continuation of application No. PCT/AT2020/060230, filed on Jun. 8, 2020.

(30) Foreign Application Priority Data

Jun. 27, 2019 (AT) .............................. A 50582/2019

(51) Int. Cl.
*E05D 5/00* (2006.01)
*E05D 3/12* (2006.01)

(52) U.S. Cl.
CPC ............ *E05D 3/12* (2013.01); *E05Y 2900/20* (2013.01)

(58) Field of Classification Search
CPC ... E05F 1/08; E05F 1/10; E05F 1/1041; E05F 1/1091; E05F 1/12; E05F 1/1223;
(Continued)

(56) References Cited

U.S. PATENT DOCUMENTS 2,085,616 A * 6/1937 Voge .......................... E05D 3/10 16/367
3,604,154 A * 9/1971 Curran .................... E05D 5/065 49/501
(Continued)

FOREIGN PATENT DOCUMENTS

CH 508800 7/1971
CN 205936073 2/2017
(Continued)

OTHER PUBLICATIONS

International Search Report dated Sep. 21, 2020 in International (PCT) Application No. PCT/AT2020/060230.
(Continued)

*Primary Examiner* — Chuck Y Mah
(74) *Attorney, Agent, or Firm* — Wenderoth, Lind & Ponack, L.L.P.

(57) ABSTRACT

A furniture drive for moving a furniture part movably-supported relative to a furniture carcass, includes a first fitting portion to be fixed to the furniture carcass, a second fitting portion to be fixed to the movable furniture part, and a hinge lever hingedly connected to the first fitting portion via a first hinge axis, and hingedly connected to the second fitting portion via a second hinge axis. The hinge lever includes at least two sections mutually spaced from one another by an offset in a direction extending parallel to the hinge axes. The first fitting portion has a first notional middle plane, and the second fitting portion has a second notional middle plane, and the middle planes are mutually spaced from one another in a direction extending parallel to the hinge axes.

22 Claims, 4 Drawing Sheets

Figure 1A:
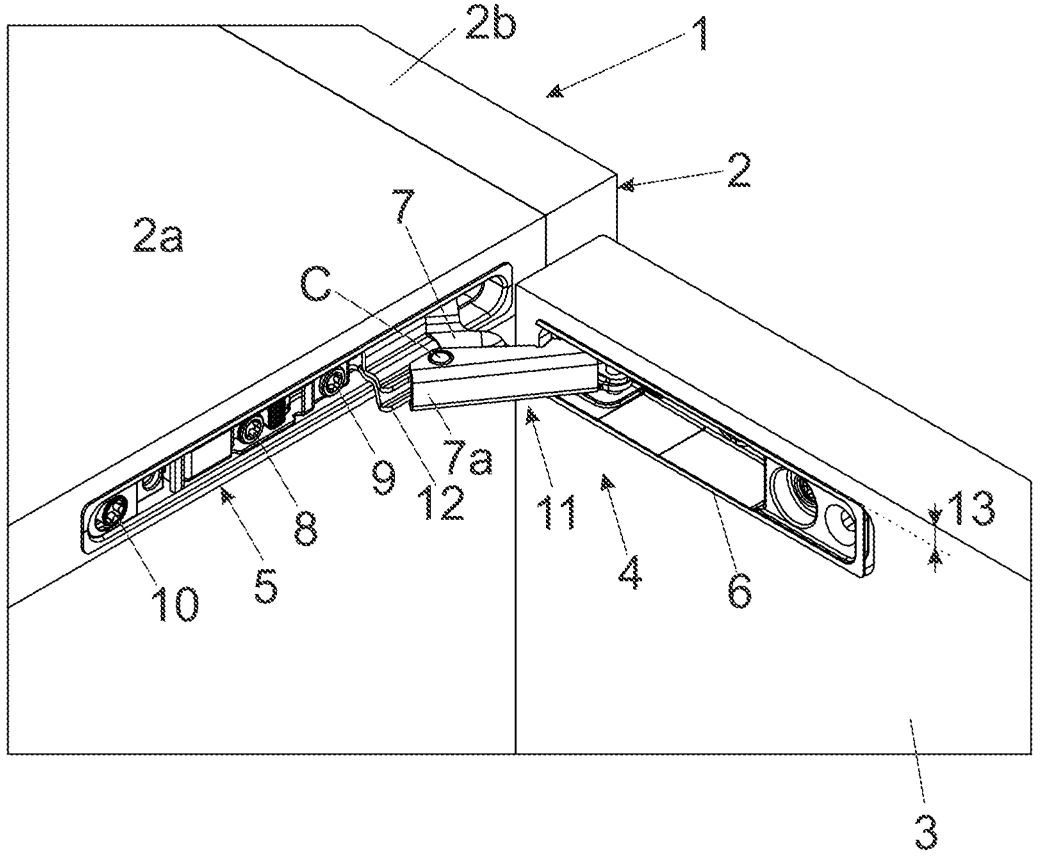

(58) Field of Classification Search
CPC ..... E05F 1/1246; E05F 1/1253; E05F 1/1261; E05F 1/1292; E05F 1/14; E05F 3/20; E05F 3/18; E05D 11/1021; E05D 3/12; E05D 3/14; E05D 3/16; E05D 11/10; E05D 15/40; E05D 15/401; E05D 15/405; E05D 15/406; E05D 15/42; E05D 15/58; E05D 15/565; E05D 3/142; E06B 3/5045; E05Y 2800/22; E05Y 2900/20; E05Y 2900/202; E05Y 2900/208; E05Y 2900/21; E05Y 2201/21; E05Y 2201/264; E05Y 2201/212; E05Y 2201/604; E05Y 2201/626; E05Y 2600/41
See application file for complete search history.

(56) References Cited

U.S. PATENT DOCUMENTS

| | | | | | |
|---|---|---|---|---|---|
| 5,898,977 | A * | 5/1999 | Muir | E05D 15/44 16/370 |
| 7,966,699 | B2 * | 6/2011 | Dubach | E05D 15/46 16/259 |
| 10,407,963 | B2 | 9/2019 | Salice | |
| 10,767,407 | B2 | 9/2020 | Salice | |
| 11,384,577 | B2 | 7/2022 | Hammerer et al. | |
| 2008/0276425 | A1 * | 11/2008 | Gherardi | A47L 15/4261 16/386 |
| 2012/0260461 | A1 * | 10/2012 | Lautenschlager | A47B 88/473 16/319 |
| 2015/0167366 | A1 * | 6/2015 | Armstrong | E05D 3/14 16/370 |
| 2018/0252016 | A1 | 9/2018 | Salice | |
| 2019/0071908 | A1 | 3/2019 | Salice | |
| 2019/0137110 | A1 * | 5/2019 | Jadhav | E05D 3/16 |
| 2021/0123275 | A1 | 4/2021 | Hammerer et al. | |

FOREIGN PATENT DOCUMENTS

| | | | | |
|---|---|---|---|---|
| CN | 107476696 | A * | 12/2017 | |
| CN | 107532444 | | 1/2018 | |
| CN | 109577770 | A * | 4/2019 | E05D 11/08 |
| CN | 112469879 | | 3/2021 | |
| DE | 28 29 727 | | 1/1980 | |
| EP | 3 418 480 | | 12/2018 | |
| JP | 2007-32174 | | 2/2007 | |
| JP | 2009-150116 | | 7/2009 | |
| JP | 2010-216203 | | 9/2010 | |
| WO | 2016/174071 | | 11/2016 | |
| WO | 2020/006587 | | 1/2020 | |

OTHER PUBLICATIONS

Chinese Search Report dated Oct. 25, 2022 in corresponding Chinese Patent Application No. 202080043922.4.

* cited by examiner

FURNITURE DRIVE

BACKGROUND OF THE INVENTION

The present invention relates to a furniture drive for moving a furniture part movably-supported relative to a furniture carcass. The furniture drive includes:

- a first fitting portion configured to be fixed to the furniture carcass,
- a second fitting portion configured to be fixed to the movable furniture part, and
- at least one hinge lever hingedly connected to the first fitting portion via a first hinge axis, and hingedly connected to the second fitting portion via at least one second hinge axis,
- wherein the at least one hinge lever includes at least two sections mutually spaced from one another by an offset in a direction extending parallel to the hinge axes.

Moreover, the invention concerns a set comprising at least two furniture drives of the type to be described.

The invention further relates to an item of furniture comprising a furniture carcass and at least one furniture part movably-supported relative to the furniture carcass, and the at least one movable furniture part is connected to the furniture carcass via at least one furniture drive of the type to be described.

Such a furniture drive is shown, for example, in DE 28 29 727 A1. The furniture drive is configured for moving a furniture flap and includes two levers pivotally arranged on a first bearing plate to be fixed to a furniture carcass on the one hand and pivotally arranged on a second bearing plate to be fixed to the furniture flap on the other hand. Each of the two levers has a cranking, whereby the levers and possibly protruding heads of the hinge pins can be nested into one another.

A further furniture drive is known from WO 2016/174071 A1 for example. With individual special solutions, difficulties may arise thereby. This is, for example, the case when a furniture door shall be mounted via the furniture drive directly below a kitchen worktop. In such a case, a gap between the upper side of the furniture door and the underside of the kitchen worktop has to be provided, thereby preventing a collision between the furniture door and the kitchen worktop and to provide a perfect pivotal movement of the furniture door between the closed end position and the opened end position. The door-sided fitting portion of the furniture drive can be countersunk into a recess of the furniture door. However, due to the reduced height of the furniture door, only a small wall thickness remains between the recess and an upper side of the furniture door. The small residual wall thickness can lead to the fact that the door-sided fitting portion of the furniture drive can only be insufficiently fixed to the furniture door or cannot be fixed at all. In this respect, there is the danger that the door-sided fitting portion can be torn out from the furniture door. A further problematic mounting situation may arise when the door-sided fitting portion shall be mounted to a frame (for example an aluminum frame) of the movable furniture part, and the frame is configured to receive a decorative plate, for example made of glass. For fixing the door-sided fitting portion to the frame—under the formation of a gap between the frame and an adjacent furniture part—there is no suitable fastening possibility available.

SUMMARY OF THE INVENTION

It is an object of the present invention to provide a furniture drive mentioned in the introductory part, thereby avoiding the above-discussed drawbacks.

According to the invention, the first fitting portion has a first notional middle plane and the second fitting portion has a second notional middle plane, and the middle planes are mutually spaced from one another in a direction extending parallel to the hinge axes.

In other words, for the pivotal connection between the two fitting portions, at least one hinge lever with two sections is provided. The two sections are mutually spaced from one another in a height direction in a mounted condition on the furniture door and provide for a desired height offset between the two fitting portions of the furniture drive. That height offset can be realized, for example, by an angled or by a cranked transition section of the hinge lever.

By the hinge lever, the second fitting portion configured to be fixed to the movable furniture part can be mounted on a lower position to or within the movable furniture part. As result, a sufficient wall thickness can remain between the recess and an upper side of the movable furniture part, and the arrangement of the second fitting portion on a frame profile for receiving a glass plate can also be provided.

The offset can be, for example, between 0.5 mm and 10.0 mm, preferably between 1.0 mm and 7.0 mm.

The at least two sections of the hinge lever can be configured to be substantially flat and being aligned substantially parallel to one another.

The first hinge axis can include a first pin and the at least one second hinge axis can include a second pin. The first pin of the first hinge axis and the second pin of the second hinge axis can be arranged mutually offset to one another in a direction extending parallel to the hinge axes.

The first fitting portion can include a first bearing surface configured to bear against the furniture carcass, and the second fitting portion can include a second bearing surface configured to bear against the movable furniture part. The first bearing surface and the second bearing surface are mutually spaced from one another by a first distance in a direction extending parallel to the hinge axes.

According to a preferred embodiment, the first fitting portion and/or the second fitting portion is or are configured to be substantially cuboidal, and/or configured such to be arranged, at least partially, preferably substantially entirely, within a recess in the furniture carcass or within the movable furniture part.

The set according to the invention includes a first furniture drive and at least one second furniture drive of the described type, and the offset of the at least one hinge lever of the first furniture drive and the offset of the at least one hinge lever of the second furniture have different sizes.

BRIEF DESCRIPTION OF THE INVENTION

Further details and advantages of the present invention result from the following description of figures.

Figure 1B:
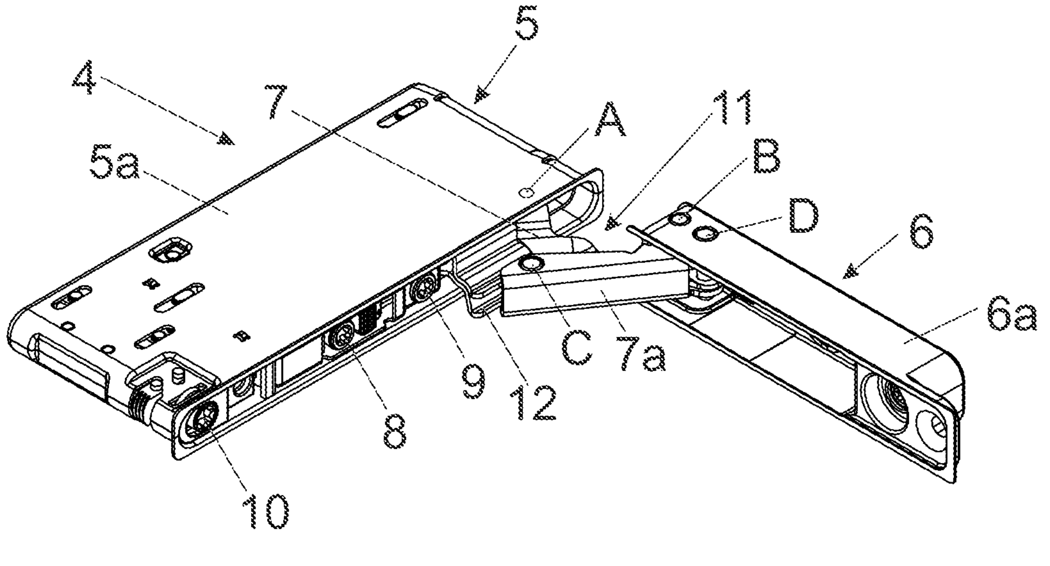
Figure 2A:
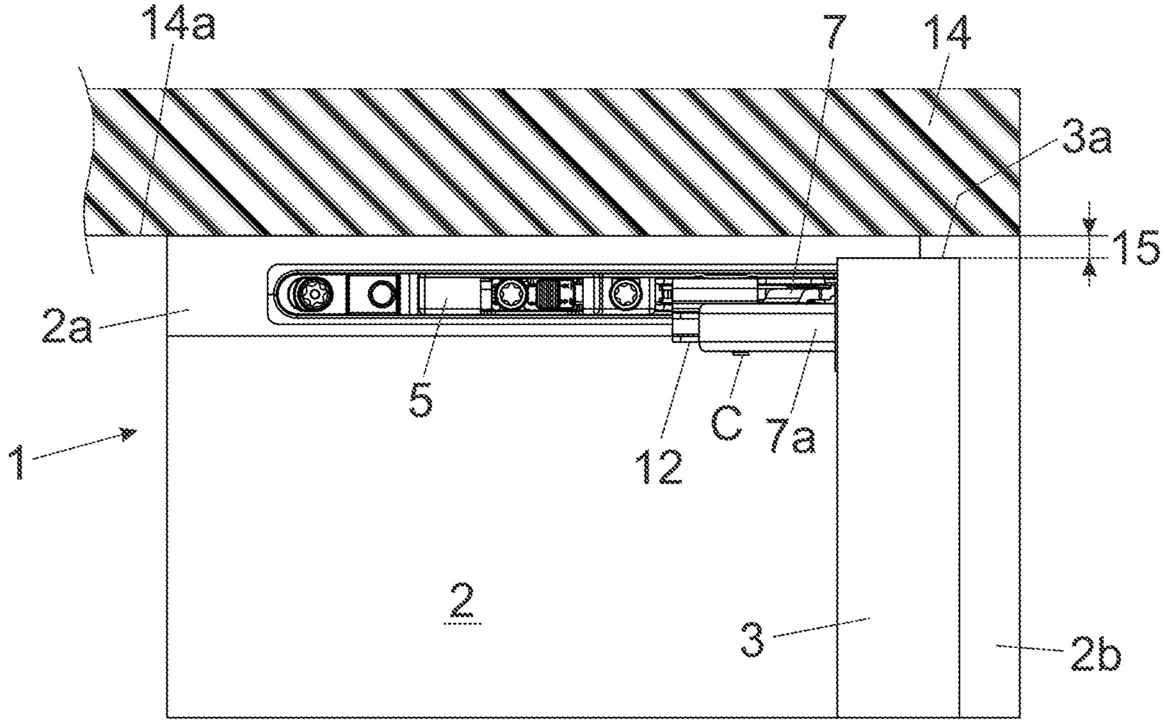
Figure 2B:
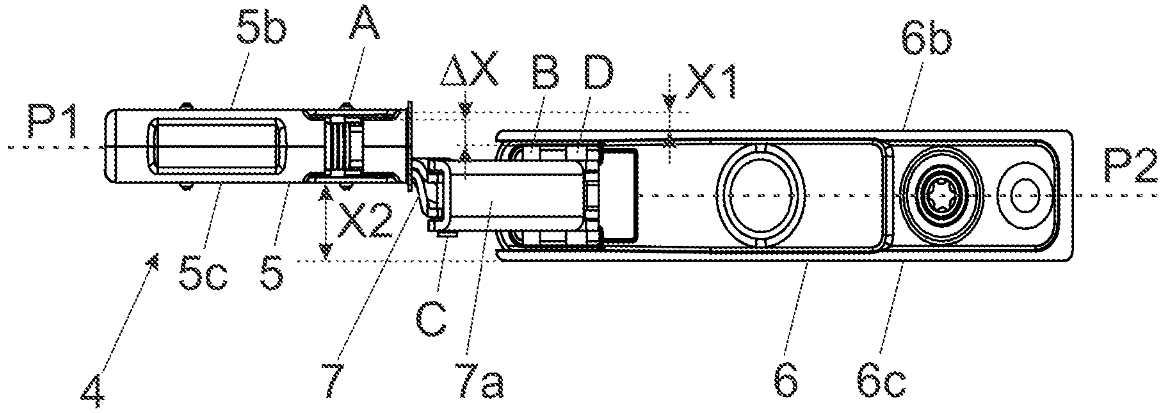
Figure 3:
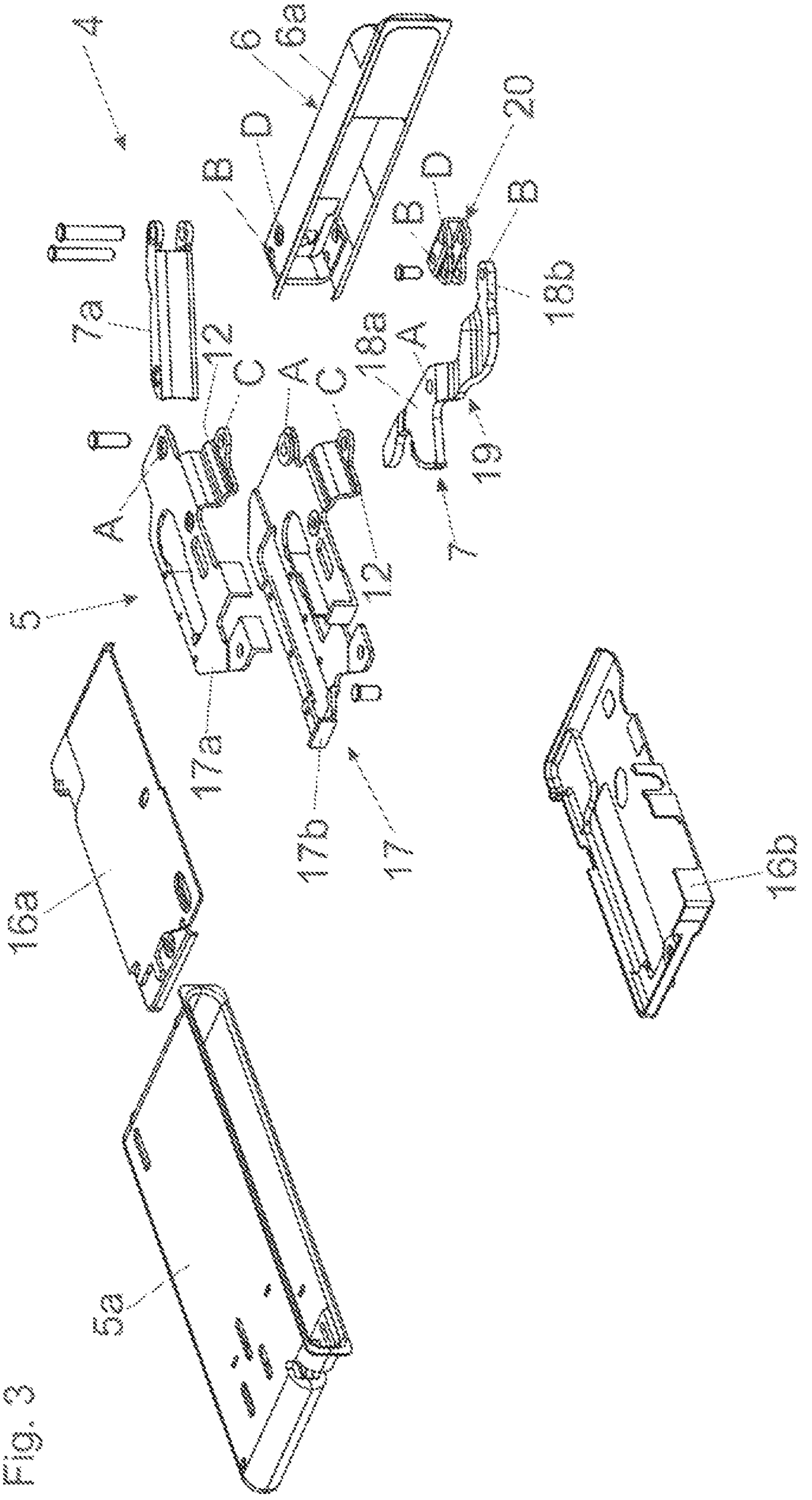
Figure 4:
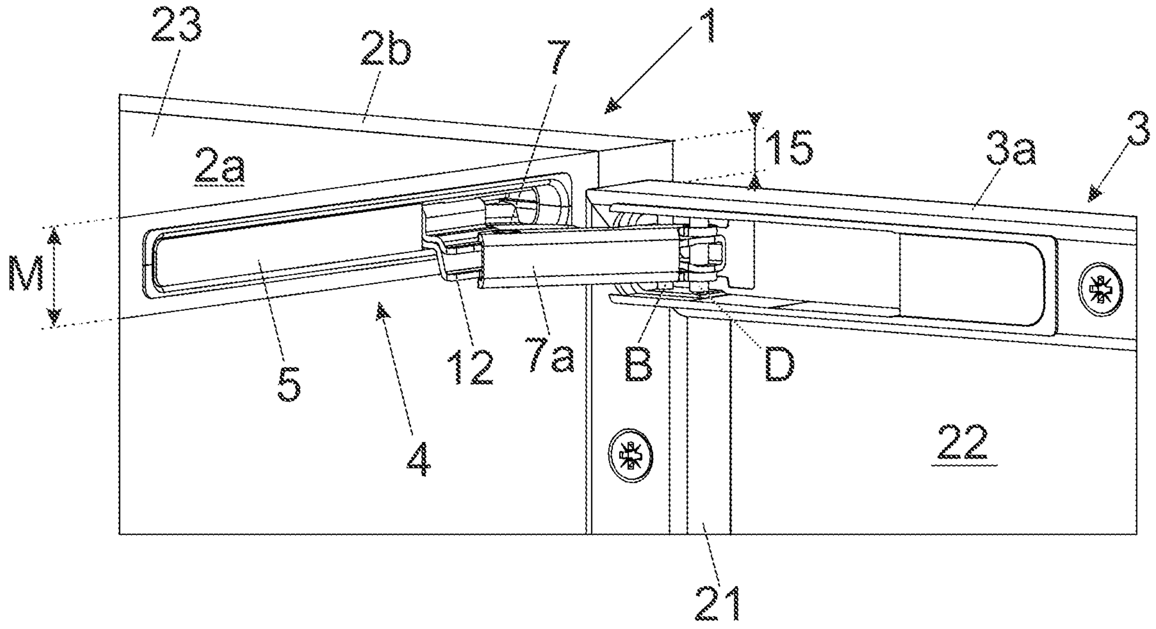

FIG. 1*a*, 1*b* show an item of furniture comprising a furniture carcass and a furniture part movable relative thereto, and a furniture drive in perspective views, FIG. 2*a*, 2*b* show the item of furniture in a view from the front, and a side view of the furniture drive, FIG. 3 is an exploded view of the furniture drive, FIG. 4 shows a possible application of the furniture drive with a movable furniture part having a frame and a decorative plate arranged within the frame.

DETAILED DESCRIPTION OF THE INVENTION

FIG. 1*a* shows a partial region of an item of furniture 1 comprising a furniture carcass 2 and a furniture part 3 movable relative to the furniture carcass 2. At least one furniture drive 4 is provided for moving the furniture part 3, and the movable furniture part 3 is pivotable about a vertically extending axis in a mounted condition via the furniture drive 4. The furniture carcass 2 includes a horizontally extending furniture panel 2*a* in the form of a top panel and a vertically extending furniture panel 2*b* in the form of a sidewall. A first fitting portion 5 of the furniture drive 4 is fixed within or to the horizontally extending furniture panel 2*a*. Of course, it is also possible to fix the first fitting portion 5 of the furniture drive 4 within or to the vertically extending furniture panel 2*b* of the furniture carcass 2. In such a case, the movable furniture part 3 would be pivotable about a horizontally extending axis relative to the furniture carcass 2, that is to say elevatable relative to the furniture carcass 2. The furniture drive 4 includes a second fitting portion 6 configured to be fixed to the movable furniture part 3. The furniture drive 4 can include at least one force storage member (not shown), and the second fitting portion 6 (and therewith the movable furniture part 3) can be moved into the fully closed position at the end of the closing movement and/or into the fully open position at the end of the opening movement by a force of the force storage member. The furniture drive 4 can include a, preferably hydraulic, damping device (for example a piston-cylinder-unit) for dampening a closing movement and/or an opening movement of the fitting portions 5, 6 relative to one another.

In the shown figure, the first fitting portion 5 of the furniture drive 4 is for the most part, preferably substantially entirely, received within a panel-shaped furniture part 2*a*, 2*b* of the furniture carcass 2. With a horizontal alignment of the furniture panel 2*a*, the first fitting portion 5 can be arranged within or on a top panel, within or on a bottom panel and/or within or on a shelf arranged between the top panel and the bottom panel. With a vertical alignment of the furniture panel 2*b*, the first fitting portion 5 can be arranged within or on a vertically extending sidewall. On the contrary, the second fitting portion 6 of the furniture drive 4 is for the most part, preferably substantially entirely, received within the movable furniture part 3. The two fitting portions 5, 6 are hingedly connected to one another via a hinge lever arrangement 11, the hinge lever arrangement 11 including at least one pivotable hinge lever 7, 7*a*.

The first fitting portion 5 is configured to be fixed to the furniture carcass 2, preferably within or to the horizontal furniture plate 2*a* of the furniture carcass 2, by at least one fastening device 10. The first fitting portion 5 can include a side adjustment device 8 having a first adjustment wheel. By a rotation of the first adjustment wheel, a position of the first fitting portion 5 can be adjusted in a lateral direction in relation to the furniture carcass 2. By a depth adjustment device 9 having a second adjustment wheel, a position of the first fitting portion 5 can be adjusted in a depth direction in relation to the furniture carcass 2.

FIG. 1*b* shows the furniture drive 4 according to FIG. 1*a* in a perspective view. The first fitting portion 5 includes a housing 5*a* and the second fitting portion 6 includes a housing 6*a*. The housing 5*a* and/or the housing 6*a* can be configured to be substantially cuboidal. The two housings 5*a*, 6*a* are can be configured to be at least partially, preferably substantially entirely, received within a recess in the furniture carcass 2 or within the movable furniture part 3.

The first hinge lever 7 of the hinge lever arrangement 11 is connected to the first fitting portion 5 via a first hinge axis (A), and is connected to the second fitting portion 6 via at least one second hinge axis (B). The first hinge axis (A) and the second hinge axis (B) are connected to one another by an angled or cranked transition section 19 (FIG. 3) of the first hinge lever 7. Therefore, the first and second hinge axes (A, B) are arranged mutually offset from one another in a height direction. In this way, the residual wall thickness 13 (FIG. 1*a*) of the movable furniture part 3 and be formed thicker and thus more stable. As a result, the second fitting portion 6 can be mounted to the movable furniture part 3 in an improved manner.

In the shown embodiment, the hinge lever arrangement 11 includes a further (second) hinge lever 7*a*. The second hinge lever 7*a* is supported about a third hinge axis (C) on a boom 12 on the first fitting portion 5. and is supported about a fourth hinge axis (D) on the second fitting portion 6. The hinge lever arrangement 11 can thus include four hinge axes (A, B, C, D), and at least three of those hinge axes (B, C, D) are arranged outside the housing 5*a* of the first fitting portion 5 in all relative positions of the fitting portions 5, 6 to one another.

FIG. 2*a* shows the item of furniture 1 with the furniture carcass 2 in a view from the front. When a worktop 14 is arranged above the horizontally extending furniture panel 2*a* of the furniture carcass 2, a gap 15 has to be provided between the upper side 3*a* of the movable furniture part 3 and the underside 14*a* of the worktop 14, so that the movable furniture part 3 does not touch the underside 14*a* of the worktop 14 upon a pivoting movement. Due to the angled transition section 19 (FIG. 3) of the hinge lever 7, the hinge axes (A, B) of the hinge lever 7 adopt a different height position to one another in all relative positions of the fitting portions 5, 6. By the height offset of the hinge axes (A, B) relative to one another, the residual wall thickness 13 (FIG. 1*a*) remaining between the upper side of the recess for receiving the second fitting portion 6 and an upper side 3*a* of the movable furniture part 3 can be formed thicker and thus more stable.

FIG. 2*b* shows the furniture drive 4 in a side view, in which the second fitting portion 6 is located in an open position in relation to the first fitting portion 5. The at least one hinge lever 7 is connected to the first fitting portion 5 via the hinge axis (A), and is connected to the second fitting portion 6 via the hinge axis (B). Due to the angled transition section 19 of the hinge lever 7, the two pins of the hinge axes (A, B) are mutually spaced from one another by an offset ($\Delta X$) in a direction extending parallel to the hinge axes (A, B).

Preferred embodiments: The first fitting portion 5 includes a first bearing surface 5*b* configured to bear on or within the furniture carcass 2. The second fitting portion 6 includes a second bearing surface 6*b* configured to bear on or within the movable furniture part 3, and the first bearing surface 5*b* and the second bearing surface 6*b* are mutually spaced from one another by a first distance (X1) in a direction extending parallel to the hinge axes (A, B). Further, the first fitting portion 5 includes a further (third) bearing surface 5*c* configured to bear on or within the furniture carcass 2, and the second fitting portion 6 includes a further (fourth) bearing surface 6*c* configured to bear on or within the movable furniture part 3, and the further third and fourth bearing surfaces 5*c*, 6*c* are mutually spaced from one another by a second distance (X2) in a direction extending parallel to the hinge axes (A, B), the first distance (X1) and the second distance (X2) having different sizes.

The first fitting portion 5 includes a first notional middle plane (i.e., a first longitudinal central axis) (P1) and the second fitting portion 6 includes a second notional middle plane (i.e., a second longitudinal central axis) (P2), and the middle planes (P1, P2) are mutually spaced from one another in a direction extending parallel to the hinge axes (A, B).

FIG. 3 shows the furniture drive 4 in an exploded view. The first fitting portion 5 includes the cuboidal-shaped housing 5*a* configured to be arranged within a recess of the furniture carcass 2. Moreover, a bearing device 17 having two bearing portions 17*a*, 17*b* is provided, and the bearing portions 17*a*, 17*b* can be received within the housing portions 16*a*, 16*b*. The housing portions 16*a*, 16*b* are configured to be releasably connected to the housing 5*a* pre-mounted to the furniture carcass 2 by a fastening device (not shown). The hinge lever 7 is partially arranged between the two bearing portions 17*a*, 17*b*, and a hinge axis (A) extends through each of the bearing portions 17*a*, 17*b*. At least one, preferably both, bearing portion(s) 17*a*, 17*b* includes or include an angled boom 12, and the further hinge lever 7*a* separate from the at least one hinge lever 7 is pivotally supported about the hinge axis (C) on the boom 12. It can be preferably provided that the boom 12 is partially arranged outside the housing 5*a* of the first fitting portion 5.

The at least one hinge lever 7 includes at least two sections 18*a*, 18*b* mutually spaced from one another by an offset (ΔX) in a direction extending parallel to the hinge axes (A, B). The at least two sections 18*a*, 18*b* of the hinge lever 7 can be configured substantially flat and can be aligned substantially parallel to one another. For example, the two sections 18*a*, 18*b* of the hinge lever 7 can be connected to one another via a, preferably multiply, angled or cranked transition section 19.

A bearing 20 can be arranged within the housing 6*a* of the second fitting portion 6, and the hinge axes (B, D) for pivotally supporting the hinge levers 7, 7*a* extend through the bearing 20.

FIG. 4 shows an application possibility of the furniture drive 4 with a movable furniture part 3 comprising a frame 21 and at least one decorative plate 22 arranged within the frame 21. For example, the frame 21 can be formed by an aluminum profile and is configured to receive the decorative plate 22, preferably made of glass. The furniture carcass 2 can include a first upper side 23 and the at least one movable furniture part 3 can include a second upper side 3*a* aligned substantially parallel to the first upper side 23. The upper sides 23, 3*a* are mutually spaced from one another in a direction extending parallel to the hinge axes A, B by the formation of a gap 15. Preferably, a size of the gap 15 corresponds to the offset (ΔX) of the at least two sections 18*a*, 18*b* of the at least one hinge lever 7.

For example, the set according to the invention is, in particular, suitable for a kitchen manufacturer equipping himself with two or more, preferably precisely three, types of furniture drives 4, and each of the of furniture drives 4 has a different offset (ΔX). Depending on a material thickness (M) of the furniture carcass 2 (for example 16 mm, 18 mm or 19 mm), depending on an offset (ΔX) to be chosen (for example between 0.5 mm and 10 mm), and depending on a material property of the movable furniture part 3 (for example wood material or a decorative plate 22 of glass), an assembling person can choose the suitable furniture drive 4 directly on the spot from the set of the two or more furniture drives 4.

The invention claimed is:

1. A furniture drive for moving a furniture part movably-supported relative to a furniture carcass, the furniture drive comprising:

a first fitting portion configured to be fixed to the furniture carcass, a second fitting portion configured to be fixed to the movable furniture part, a hinge lever hingedly connected to the first fitting portion via a first hinge axis, and hingedly connected to the second fitting portion via a second hinge axis, wherein the hinge lever includes at least two sections mutually spaced from one another by an offset in a direction extending parallel to the hinge axes, wherein the first fitting portion has a first longitudinal central axis and the second fitting portion has a second longitudinal central axis, and the first and second longitudinal central axes are mutually spaced from one another in a direction extending parallel to the hinge axes, and wherein the first fitting portion includes a bearing device having a first bearing portion and a second bearing portion spaced from the first bearing portion, and the hinge lever is partially arranged between the first and second bearing portions.

2. The furniture drive according to claim 1, wherein the offset is between 0.5 mm and 10.0 mm.

3. The furniture drive according to claim 2, wherein the offset is between 1.0 mm and 7.0 mm.

4. The furniture drive according to claim 1, wherein the at least two sections of the hinge lever are each configured substantially flat and are aligned substantially parallel to one another.

5. The furniture drive according to claim 1, wherein the first hinge axis includes a first pin and the second hinge axis includes a second pin, wherein the first pin of the first hinge axis and the second pin of the second hinge axis are arranged mutually offset to one another in a direction extending parallel to the hinge axes.

6. The furniture drive according to claim 1, wherein the hinge lever is a first hinge lever, and wherein at least one of the first and second bearing portions includes an angled boom, the furniture drive further comprising a second hinge lever separate from the first hinge lever, the second hinge lever being pivotally arranged on the boom.

7. The furniture drive according to claim 6, wherein both of the first and second bearing portions include an angled boom, and the boom is partially arranged outside a housing of the first fitting portion.

8. The furniture drive according to claim 1, wherein the first fitting portion includes a first bearing surface configured to bear on or within the furniture carcass, the second fitting portion including a second bearing surface configured to bear on or within the movable furniture part, wherein the first bearing surface and the second bearing surface are mutually spaced from one another by a first distance in a direction extending parallel to the hinge axes.

9. The furniture drive according to claim 8, wherein the first fitting portion includes a third bearing surface configured to bear on or within the furniture carcass, the second fitting portion including a fourth bearing surface configured to bear on or within the movable furniture part, wherein the third and fourth bearing surfaces are mutually spaced from one another by a second distance in a direction extending parallel to the hinge axes, wherein the first distance and the second distance have different sizes.

10. The furniture drive according to claim 1, wherein the first fitting portion and/or the second fitting portion is or are configured substantially cuboidal, and/or is or are configured to be arranged at least partially within a recess of the furniture carcass or within the movable furniture part.

11. The furniture drive according to claim 10, wherein at least one of the first fitting portion and the second fitting portion is configured to be arranged substantially entirely within the recess of the furniture carcass or within the movable furniture part.

12. A set comprising a first furniture drive and a second furniture drive each configured according to claim 1, wherein the offset of the hinge lever of the first furniture drive and the offset of the hinge lever of the second furniture drive have different sizes.

13. An item of furniture comprising a furniture carcass and a movable furniture part movably-supported relative to the furniture carcass, wherein the movable furniture part is connected to the furniture carcass via the furniture drive according to claim 1.

14. The item of furniture according to claim 13, wherein the furniture carcass includes a first upper side and the movable furniture part includes a second upper side aligned substantially parallel to the first upper side, wherein the first and second upper sides are mutually spaced from one another in a direction extending parallel to the hinge axes by a gap.

15. The item of furniture according to claim 13, wherein the first fitting portion is arranged within or on a horizontally or vertically aligned furniture panel of the furniture carcass.

16. The item of furniture according to claim 15, wherein the first fitting portion is arranged entirely within a recess of the furniture panel.

17. A furniture drive for moving a furniture part movably-supported relative to a furniture carcass, the furniture drive comprising:

a first fitting portion configured to be fixed to the furniture carcass, a second fitting portion configured to be fixed to the movable furniture part, a hinge lever hingedly connected to the first fitting portion via a first hinge axis, and hingedly connected to the second fitting portion via a second hinge axis, wherein the hinge lever includes at least two sections mutually spaced from one another by an offset in a direction extending parallel to the hinge axes, wherein the first fitting portion has a first longitudinal central axis and the second fitting portion has a second longitudinal central axis, and the first and second longitudinal central axes are mutually spaced from one another in a direction extending parallel to the hinge axes, and wherein the hinge lever is a first hinge lever, the first fitting portion and the second fitting portion being connected to one another by a hinge lever arrangement, the hinge lever arrangement including the first hinge lever and a second hinge lever, wherein the hinge lever arrangement includes at least four hinge axes.

18. The furniture drive according to claim 17, wherein at least three of the at least four hinge axes are arranged outside a housing of the first fitting portion in all relative positions of the fitting portions to one another.

19. An item of furniture comprising:

a furniture carcass, a movable furniture part movably-supported relative to the furniture carcass, and a furniture drive connecting the movable furniture part to the furniture carcass, the furniture drive comprising:

a first fitting portion configured to be fixed to the furniture carcass, a second fitting portion configured to be fixed to the movable furniture part, a hinge lever hingedly connected to the first fitting portion via a first hinge axis, and hingedly connected to the second fitting portion via a second hinge axis, wherein the hinge lever includes at least two sections mutually spaced from one another by an offset in a direction extending parallel to the hinge axes, wherein the first fitting portion has a first longitudinal central axis and the second fitting portion has a second longitudinal central axis, and the first and second longitudinal central axes are mutually spaced from one another in a direction extending parallel to the hinge axes, wherein the furniture carcass includes a first upper side and the movable furniture part includes a second upper side aligned substantially parallel to the first upper side, wherein the first and second upper sides are mutually spaced from one another in a direction extending parallel to the hinge axes by a gap.

20. The item of furniture according to claim 19, wherein the movable furniture part is pivotable about an axis extending vertically or horizontally, and/or includes a frame and a decorative plate made of glass and supported in or on the frame.

21. The item of furniture according to claim 20, wherein a size of the gap corresponds to the offset of the at least two sections of the hinge lever.

22. The item of furniture according to claim 19, wherein a size of the gap corresponds to the offset of the at least two sections of the hinge lever.

* * * * *